Dec. 12, 1944.  H. C. WARNER ET AL  2,364,932
MACHINE TOOL
Original Filed March 29, 1937   5 Sheets-Sheet 4
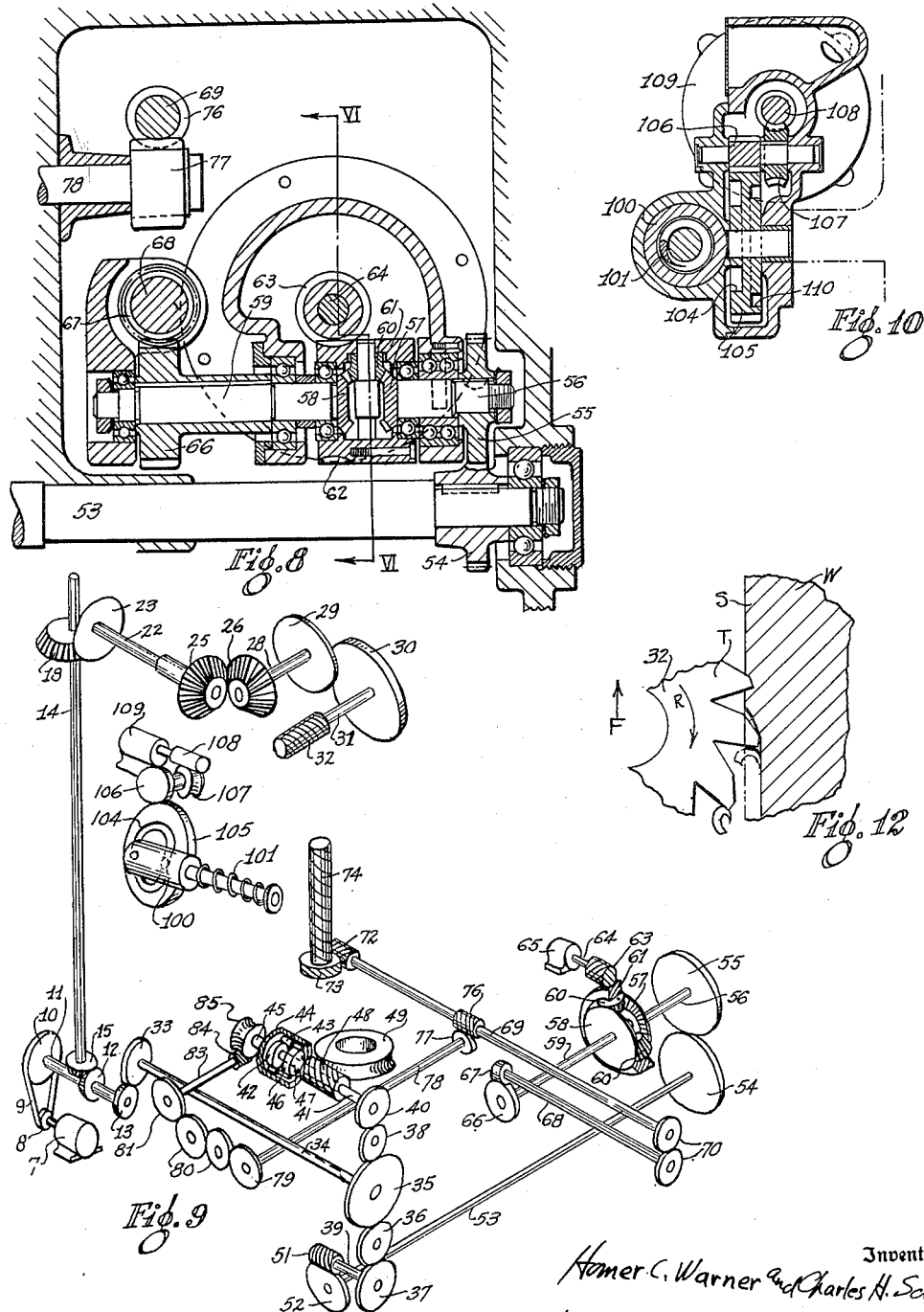
Inventors
Homer C. Warner and Charles H. Schurr
by Hawgood and Van Horn
Attorneys

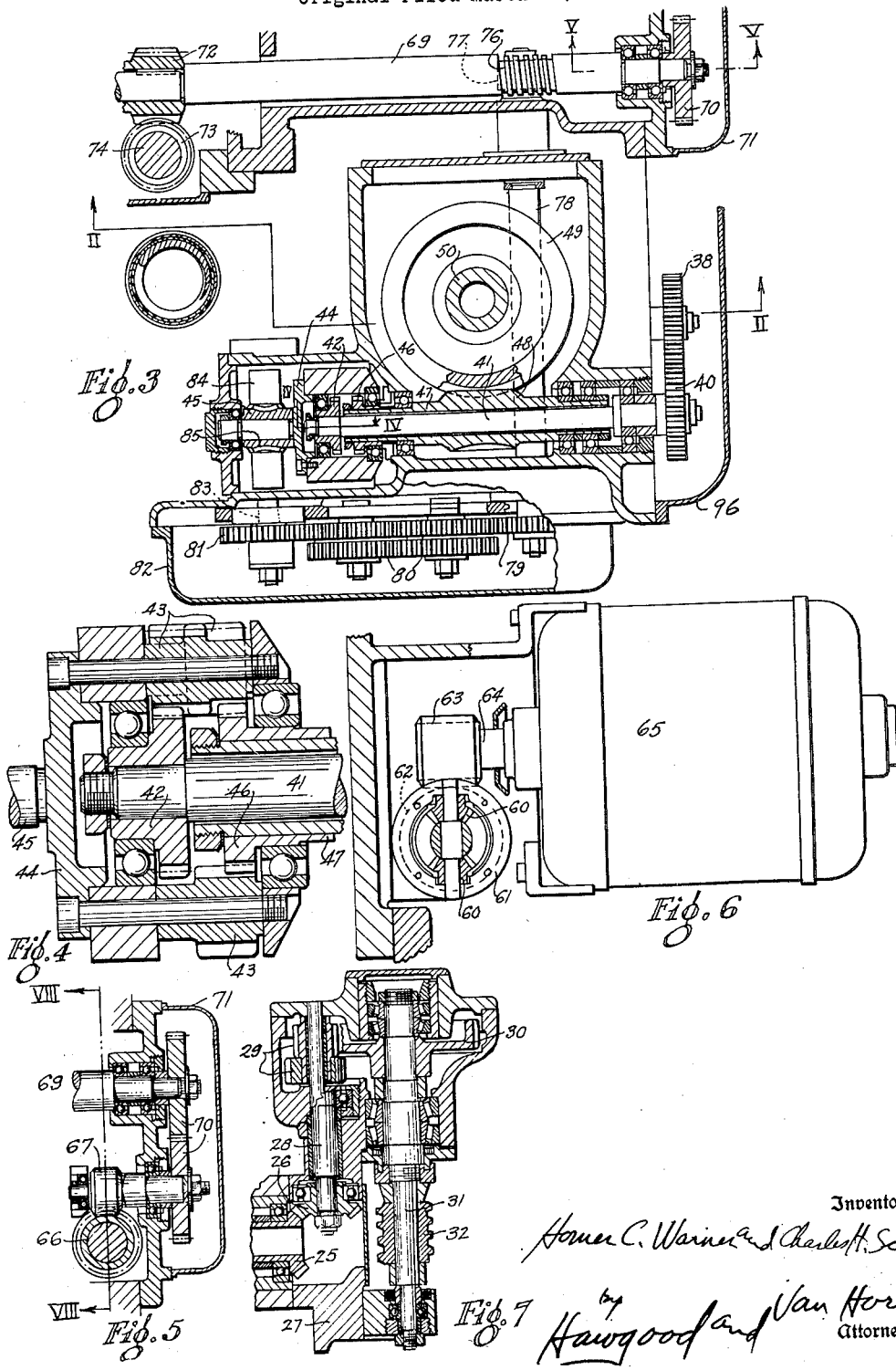

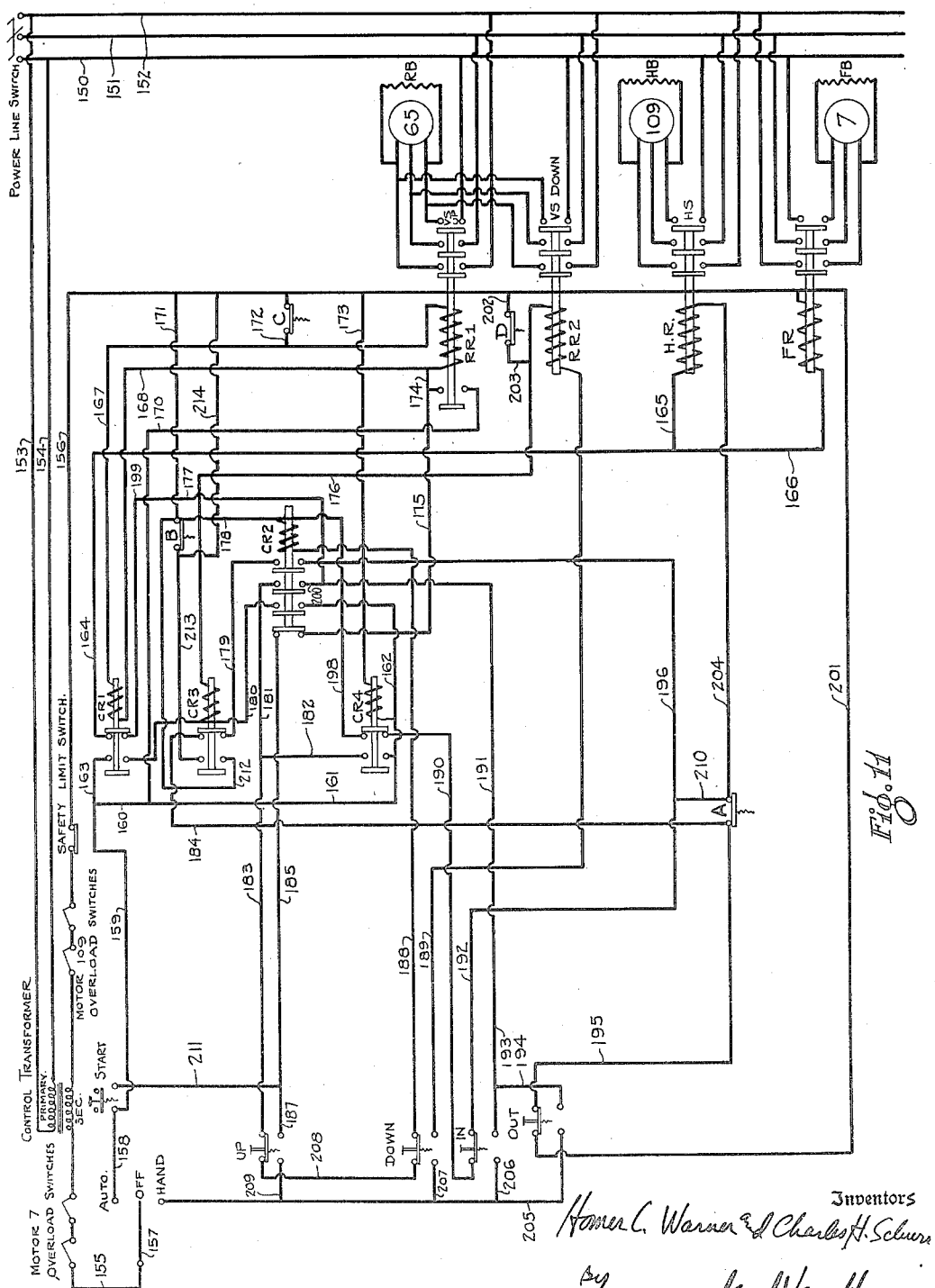

Patented Dec. 12, 1944                                    2,364,932

UNITED STATES PATENT OFFICE 2,364,932

MACHINE TOOL

Homer C. Warner and Charles H. Schurr, Cleveland, Ohio, assignors to The Lees-Bradner Company, Cleveland, Ohio, a corporation of Ohio Original application March 29, 1937, Serial No. 133,554. Divided and this application March 20, 1940, Serial No. 325,028

9 Claims. (Cl. 90—4)

This invention relates to a machine tool particularly adapted for cutting irregular or non-cylindrical objects such, for instance, as gear teeth.

An object of the invention is to provide an improved machine tool which will be highly efficient in operation.

Another object is to provide an improved machine tool which will require little attention.

Another object is to provide an improved machine tool which will be economical of floor space.

Another object is to provide an improved machine tool which will be rapid and accurate in its operation.

Other objects will hereinafter appear.

The invention will be better understood from the description of one practical embodiment thereof, illustrated in the accompanying drawings, in which:

Figure 3 is a fragmentary sectional view taken on the line III—III of Figure 1;

Figure 4 is a fragmentary sectional view taken on the line IV—IV of Figure 3;

Figure 5 is a fragmentary sectional view taken on the line V—V of Figure 3;

Figure 6 is a fragmentary sectional view taken on the line VI—VI of Figure 8;

Figure 7 is a fragmentary sectional view taken on the line VII—VII of Figure 1;

Figure 8 is a fragmentary sectional view taken on the line VIII—VIII of Figure 5;

Figure 9 is a perspective diagrammatic view of the gear trains illustrated in the preceding figures;

Figure 10 is a fragmentary sectional view of the slide actuating mechanism taken on line X—X of Figure 2;

Figure 11 is a diagrammatic illustration of the electrical circuits controlling the parts above illustrated; and Figure 12 is a sectional fragmentary view illustrating the manner of making a cut.

Figure 1:
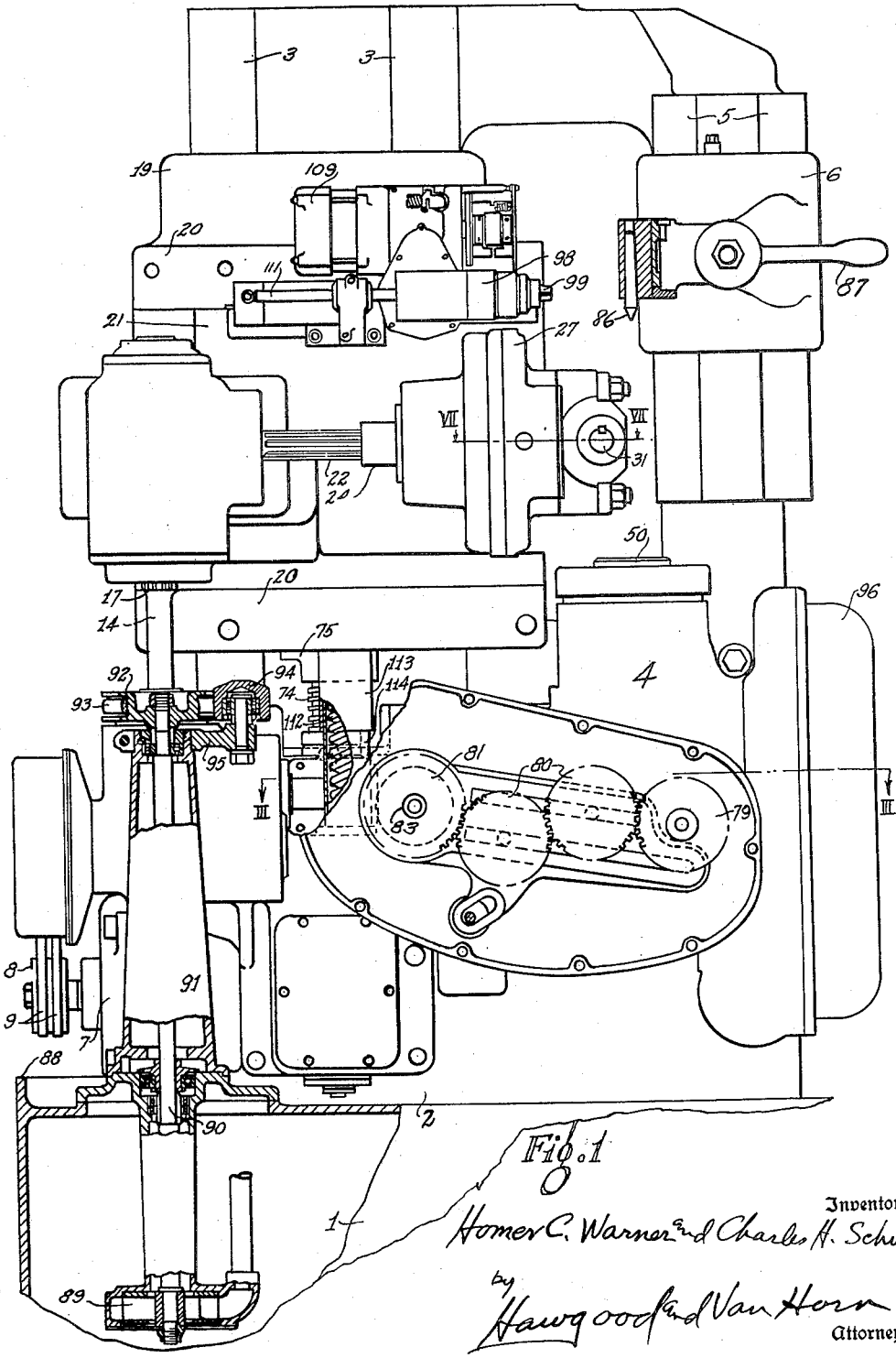
Figure 1 is a side elevational view of the machine embodying the invention, parts being broken away and shown in section.

This application is a division of our copending application, Serial Number 133,554, filed March 29, 1937.

The machine illustrated consists of a supporting base 1 upon which is mounted a frame 2 carrying the working parts of the machine.

The base 1 may be a stationary pedestal as illustrated, or it may be a rotating turntable such as illustrated in our application, Serial Number 567,276, now Patent Number 2,075,489, which was copending with the above mentioned application, of which this is a division, corresponding to the rotating base or table 2 of this application which extends laterally from the center hub or flange 4 shown in said application.

The frame 2 is formed with upwardly extending ways 3, upon which are slidably mounted the tool head and its associated parts, to be hereinafter further described, and also includes a hollow projecting casing portion 4 in which is journalled the work spindle, and which carries parts of the mechanism which control and operate said spindle.

In addition, vertical ways 5 are formed upon the frame and upon these is carried a tailstock 6.

Mounted upon the base 1 is the main driving motor 7, shown as provided with a pulley 8 from which belts 9 pass to a pulley 10 secured to the end of a horizontal shaft 11 journalled in the frame. Also secured to the shaft 11 are a bevelled gear 12 and a spur gear 13, from the former of which power is transmitted to the cutter or tool, and from the latter it is transmitted to the work and feed mechanisms.

Mounted in bearings on the frame is a vertically extending shaft 14, having keyed to its lower end a bevelled gear 15, meshing with a bevelled gear 12, and also having keyed to it a pulley 16 for driving the pumping mechanism which will be hereinafter described.

The upper end of the shaft 14 is splined as indicated at 17, and slidable upon it is a bevelled gear 18 which is mounted in bearings in a vertically movable carriage 19 engaging and slidable upon the above referred to ways 3.

The carriage 19 is itself provided with horizontal ways 20 upon which is mounted a horizontally movable slide 21.

A horizontal shaft 22 is mounted in bearings upon carriage 19 and provided with a bevelled gear 23 meshing with gear 18. This shaft is splined to telescopically engage with another horizontal shaft 24 having complementary splines and mounted in bearings within the slide 21.

The end of shaft 24 remote from shaft 22 has formed integrally with it a bevelled gear 25 which meshes with a bevelled gear 26 carried by a tool supporting head 27 which is secured to the end of the slide 21 by bolts or the like, so as to be angularly adjustable about the axis of shafts 22 and 24.

This gear is keyed to a shaft 28 which, through reduction gearing 29, drives a gear 30 keyed to the cutter spindle 31 which is supported in bearings in head 27 parallel to shaft 28 and is shown provided with a hob 32.

Meshing with gear 13 is a gear 33 splined to a horizontal shaft 34 journalled in the frame 2 and extending through housing 4. The outer end of this shaft is provided with a change gear 35 which drives, through change gears 36 and 37, a horizontal shaft 39.

An idler 38 meshes with gear 35 and with a gear 40 secured to a horizontal shaft 41 to which is also keyed a gear 42, forming a part of a differential mechanism most clearly shown in Figure 4 to an enlarged scale.

The differential mechanism includes idlers 43 journalled in a cage 44, supported by a shaft 45 coaxial with shaft 41 and driven by means to be hereinafter explained, and also a gear 46 fixed to a hollow shaft 47 surrounding shaft 41 and provided with a worm 48 which meshes with a worm wheel 49.

The worm wheel 49 is keyed to a vertically extending work spindle 50 mounted in suitable bearings in housing 4.

From the above, it will be apparent that when motor 7 is operated, it drives, through pulley 8, belts 9, and pulley 10, the shaft 11. To this is positively connected, by gears 12 and 15, shaft 14, gears 18 and 23, shafts 22 and 24, gears 25 and 26, shaft 28, and gears 29 and 30, the cutter spindle 31. Hence there is imparted to the cutter 32 a rotation which is always in fixed relation to the rotation of shaft 11.

Also, power is transmitted from shaft 11 through gears 13 and 33; shaft 34; gears 35, 38, and 40; shaft 41; gears 42, 43, and 46; shaft 47; worm 48; and worm wheel 49, to the work spindle 50, this rotation also being directly related to the rotation of shaft 11 excepting for any variation which may be produced by rotation of differential cage 44 by shaft 45.

Thus the two trains of gearing already described produce the proper relative rotation of hob and work which would be necessary to generate gear teeth upon a work blank mounted on spindle 50, and if the gear to be produced is of the ordinary spur type having teeth parallel its axis, in which case no increment of rotation need be added to the differential mechanism referred to, but it would be only necessary, if the face of the gear were wide, to provide an axial feed or lead movement of the cutter relative the work in the direction of the axis of the latter.

However, as it is desired that the machine tool may be used in the production of other types of products, such as gears having helically disposed teeth, means have been provided for imparting an increment of rotation related to the relative position of the tool axially of the work.

As previously mentioned, the change gears 36 and 37 drive a horizontal shaft 39 mounted within the frame of the machine. This shaft is provided with a worm 51 meshing with a worm wheel 52 secured to a shaft 53 horizontally journalled in the frame and extending transversely of the machine, as most clearly shown in Figures 2, 8, and 9.

Keyed to the shaft 53 is a gear 54 which meshes with a gear 55 secured to a shaft 56 parallel to shaft 53 and journalled in the frame. Also secured to shaft 56 is a bevelled gear 57 forming a part of a second differential mechanism.

This differential mechanism comprises a bevelled gear 58 opposed to gear 57 and secured to a shaft 59 coaxial with shaft 56, the two bevelled gears meshing with bevelled pinions 60 carried in a cage 61 on the exterior of which is formed a worm wheel 62. Meshing with the worm wheel 62 is a worm 63 fixed to the shaft 64 of an electric motor 65.

Keyed to shaft 59 is a skew gear 66 meshing with a second skew gear 67 secured to a shaft 68 which extends to the exterior of the frame. Here it is connected with a parallel shaft 69 by change gears 70, these being enclosed within a cover 71.

The shaft 69 has keyed to it, adjacent its end remote from change gears 70, a skew gear 72 which meshes with a skew gear 73 formed upon a lead screw 74.

This lead screw is threaded through a nut 75 secured to carriage 19 and serves to impart vertical lead or feed movement to the tool by controlling the motion of the carriage up and down upon ways 3.

It will thus be seen that, through skew gears 72 and 73, shaft 69, gears 70, shaft 68, skew gears 66 and 67, shaft 59, bevelled gears 57, 58, and 60, shaft 56, gears 54 and 55, shaft 53, and worm 51 and worm wheel 52, and gears 35, 36, and 37, the lead screw is positively connected back to shaft 34, which drives the work spindle, and that if motor 65 remains stationary, the rotation of screw will be in direct proportion to the rotation of shafts 11 and 34.

If, however, motor 65 is rotated, it rotates bevelled pinions 60, through worm 63 and worm wheel 62, adding an increment of rotation to the movement of screw in addition to the rotation caused by the drive shaft 11.

Formed on shaft 69 is a worm 76 which meshes with a worm wheel 77 secured to a transverse horizontal shaft 78. This shaft extends through the frame, passing beneath worm wheel 49, to the exterior of the frame, where it is provided with a gear 79, which drives, through change gears 80, a gear 81. These gears are enclosed within a cover 82 secured to the frame.

Gear 81 is keyed to a shaft 83 extending within the frame provided with a worm 84 meshing with a worm wheel 85.

The worm wheel 85 is fixed to shaft 45 which, as above mentioned, carries the cage of the differential mechanism shown in Figure 3. It will thus be seen that this cage is positively geared to the shaft 69 and so is controlled in its motion in accordance with the lead or feed of the tool axially of the work.

By suitably selecting change gears 80, the cage 44 may therefore be rotated to add any desired increment to the rotation of the work spindle in proportion to the axial travel of the tool, thus simply providing for producing gears of any desired helix angle.

If gears having teeth parallel to their axes are desired, the change gears 80 may be omitted, and the worm 84 locked against rotation, which may be accomplished by having a low pitched worm which will be self-locking, or by any other desired means.

Motor 7 is of relatively high power and low speed in comparison with motor 65, as its function is to drive the mechanism while performing its work, while the function of the latter mentioned motor is to drive the parts on part of their return, and it may therefore be of less power and drive at a higher speed.

When motor 7 is being actuated and motor 65 is stationary, the latter, having a low-pitched worm at 63, locks the cage 62 against rotation, so that differential mechanism at this point acts merely as a set of idler gears, the various drives from shaft 11 being as above described.

When, however, motor 7 is allowed to remain stationary and motor 65 is operated, cage 62 is driven by worm 63. Worm 51 locks, due to its low pitch, worm wheel 52 and shaft 53. Power is therefore transmitted through gears 60, 58, 66, 67, and 70 to shaft 69, which through gears 72 and 73 operates the elevating screw, and at the same time through worm 76, worm wheel 77, gears 79, 80, and 81, and worm and worm wheel 84 and 85 imparts the necessary increment to the rotation of work spindle to correspond with the elevation caused by the screw.

Figure 2:
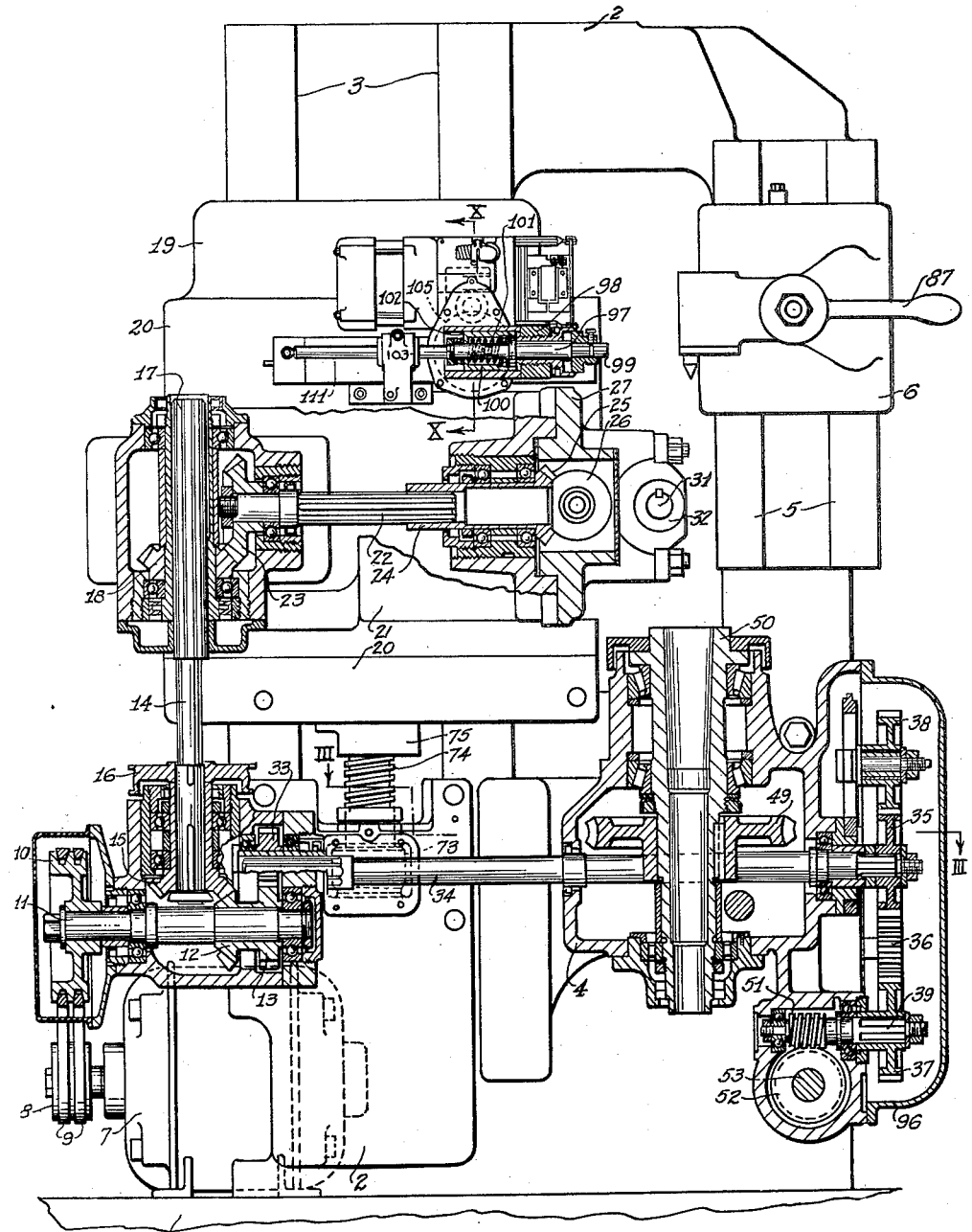
Figure 2 is a sectional view taken on a plane parallel to Figure 1 as indicated by the line II—II of Figure 3.

As best illustrated in Figures 1 and 2, the tail stock consists of a slide 6 mounted upon vertical ways 5 on the frame. This tail stock is provided with a dead center 86 and with means for clamping the stock in place consisting of a bolt or cam provided with an actuating handle 87. The dead center is, of course, in axial alinement with the work spindle 50.

The base 1 is provided with an upwardly extending marginal flange 88 which forms a trough upon the top of the base adapted to catch coolant and direct it into the hollow of the base which constitutes, in effect, a tank for this material. Within this hollow of the base is a pump 89 provided with a vertically extending shaft 90 supported in a column or pedestal 91 which extends above the base. The upper end of the shaft is provided with a pulley 92 around which passes a belt 93 and is driven from pulley 16 mounted on shaft 14. The belt is maintained taut by an idler pulley 94 adjustably carried upon an arm 95.

A cover 96 is secured to the frame and encloses gears 35 to 38 and 40.

Mechanism for feeding the cutter into depth is shown as comprising a stop against which the horizontally moving slide may be pressed.

This stop consists of a rod 97 threaded into a threaded boss 98 formed on the vertically slidable carriage and provided with a squared end 99 by which it may be adjusted. In alinement with this stop is a plunger 100 provided with compressed coil spring 101 arranged to move the horizontal slide against the stop.

The plunger is also provided with a shoulder 102 for engaging a shoulder within the slide for withdrawing the slide from the stop when reciprocation takes place in the opposite direction.

This plunger has a projecting lug or trunnion 103 entering a cam groove 104 cut in a gear journalled on the vertical slide, this gear being driven by a pinion 106 made integral with a worm wheel 107 which is engaged by a worm 108 carried by the shaft of an electric motor 109 fixed to the vertical slide.

The opposite side of the gear 105 has a somewhat similar cam groove 110 capable of actuating a sliding plunger 111 which operates switches controlling the motor 109 carried by the vertical slide and entering into circuits controlling motors 7 and 65 to be hereinafter described.

It will thus be apparent that when the gear 105 is rotated, until trunnion 103 is moved into the part of the cam groove remote from the center of the gear, the slide is moved to the right (as seen in the drawings) and is pressed firmly against the stop rod 97, the spring 101 being further compressed during this action.

When the gear 105 rotates to bring the trunnion 103 into the inner portion of the cam groove, the slide is retracted toward the left (as seen in these figures), the spring 101 expanding to cause the shoulder 102 to bear upon the internal shoulder formed in the recess in which the rod may reciprocate.

Similarly, when the slide has reached its extreme position, either to the right or the left, the switch actuating rod 111 is reciprocated to stop the motor until after the vertical movement which follows feeding into depth or retraction therefrom takes place.

The vertical slide is supported by a compression spring 112, shown as disposed within telescopic tubular covers 113 and 114 and positioned between the base and the slide.

This spring is of sufficient strength that it more than supports the weight of the carriage and associated parts and causes this to exert an upward pressure at all times upon the thread of feed screw 74.

The feed of the cutter through the work is really accomplished by the spring, while the feed screw, instead of causing the cutter to move through the work, restrains this motion therethrough, acting as a positive stop of constantly continuously decreasing length.

This also eliminates any backlash in the feed, as the spring holds the screw tight against its bearings. These bearings constitute, in effect, a positive stop fixed with respect to the frame.

Inasmuch as the movement of the hob toward the axis of the work is positively and definitely limited by the stop 97, and as the upward movement of the carriage is very positively and rigidly controlled by the upward pressure upon the threads of the lead screw, it is possible to cut in a manner different from that which has heretofore been employed.

With the parts arranged as shown in the drawings, a hob 32 is provided having teeth T arranged to cut when turning in clockwise direction, as seen in Figures 1, 2 and 12 and indicated by arrow R, and the cutting feed of the hob relative the work W is caused to operate in an upward direction as shown by arrow F. This causes the hob teeth to enter the piece of work from their cylindrical outer surface S inwardly, starting at a relatively large angle to this surface and cutting in an oblique downward direction. As the cut progresses, the hob rises or "climbs" along the work, always starting to cut at the periphery of the work, rather than as has been heretofore the practice, at the bottom of the part previously cut.

Thus each tooth of the hob passes at a relatively obtuse angle into the surface of the work, starting its cutting action as soon as it contacts the metal of the work, instead of tending to at first approach the work at a very acute angle and slide over the same, creating friction, which impairs the cutting edges.

With previous types of hobbing machines, this cutting would be extremely difficult, if not impossible, because of the tendency of the cutter to pull itself forward, as it is acting in the same direction of the feed, thus gouging and otherwise mutilating the work.

The having of the cutting edges of the hob teeth move in the direction in which the hob is being fed, rather than in the opposite direction, is found to very substantially prolong the life of the cutter between sharpenings, and thus to increase the speed of production of the mechanism.

As previously mentioned, the rod on the vertical slide is arranged to operate switching means, these consisting of a switch A which will be opened when the horizontally movable slide is at its extreme right hand or full depth position, and a switch B which will be opened when it is at its extreme left hand or retracted position. Additionally switches C and D are carried by the frame, the former being opened when the parts are in position to start cutting, and the latter when they are in position at the end of a cut.

Additional safety, overload, and manually operable switches are provided, as are relays for starting and controlling the motors.

These parts are all diagrammatically illustrated in Figure 11 while the structure of the parts themselves will be readily understood, so that only the circuit and the cycle of operation will be described.

Power is received from any suitable source as from power lines 150, 151, and 152 controlled by a "power line switch," passing through conductors to three relays which control the three motors 7, 65, and 109 respectively.

From the power lines also current is furnished through conductors 153 and 154 to the primary of a control transformer, from the secondary of which current is taken to operate the relays referred to, as well as others entering into the control circuits.

In the transformer secondary circuit are located overload switches controlled by the current supplied to motors, as well as a "safety limit switch," the operation of any one of which will break the main control circuit and so stop all operation of the mechanism.

From the secondary of the transformer, current is carried through a conductor 155 to a manually operable selective switch 157, and which may be put either upon the contact "hand" for manual control of the motors, or on the contact "auto" for the automatic control thereof.

Assuming that the parts are in their respective positions for starting a cycle of operation, the slide will be retracted from the work to its maximum degree, and the carriage will be at the elevation at which the cut is completed. In this position, switches B and D will be opened and switches A and C closed.

If switch 157 is placed on contact "auto," current will pass directly at all times through conductors 161 and 173 to the coil of relay CR4, holding this, throughout automatic operation, to the right as seen in Figure 11.

If now the operator, after inserting a piece of work, presses the "start" button, current from the control transformer passes through the overload switches of the return and horizontal feed motors and conductor 155 to the selective switch 157, thence to contact "auto," thence through conductor 158 to the "start" switch, through this switch to conductors 211, 185, and 175, by which it is carried to the coil of relay RR1, through switch C, thence through conductor 156, switch "safety," and the overload switches of the feed motor 7, back to the secondary of the control transformer.

Simultaneously, some of the current passes through conductor 168, coil of relay CR1, which is arranged in parallel with the coil of relay RR1, and conductor 167 to switch C. This moves the armatures of relays RR1 and CR1 to the right, as shown in the diagram, closing the contacts to supply current from the power lines 150, 151, and 152 to the return stroke motor 65, and thus causing this motor to operate, whereupon the vertically movable carriage is moved to the position to start cutting.

When the operator releases the "start" switch, current may pass through conductors 158, 159, 169, and 170 through the then closed contacts of relay RR1 and conductor 174 to maintain the coils of relay RR1 and CR1 energized until switch C is opened. This occurs when the vertically movable carriage has reached the position to start cutting, while during the motion of the carriage, switch B has been permitted to close. The opening of switch C de-energizes relays RR1 and CR1, permitting the armatures to return to the left as shown in the diagram.

In this portion of the cycle switches A and D are closed and current now passes through conductors 161, 162 to the coil of relay CR3, thence through switch D to line 156, moving relay CR3 to the right as shown in the diagram, and permitting current to flow through conductors 182, 181, 191, 177 and 164 to coil of relay HR, thence through switches A, conductor 195, switch "out"; thus reaching line 145, which actuates motor 109 to move the horizontal slide to the right, as shown in the drawings, feeding the cutter into depth or against the stop. When this has been accomplished, switch A is opened, while during the motion, switch C has been permitted to close, so that current now passes through conductors 161, 162 and 180, coil CR3 to line 156, and also through conductors 182, 181, 183, 208, and 188 to coil of relay CR2, thence through conductors 212, 213, and 214 to line 156.

Current also passes through conductors 181, 200, 177, 164 and 166 to the coil of relay FR and thence to line 156, causing the feed motor 7 to operate and feed the tool through the work.

During this portion of the cycle switch B again closes, while at the end of the cycle switch D is opened, so that the current now passes to conductors 182, 183, 208 and 188 to the coil of relay CR2 through switch B, conductor 214 to the line 156; which in turn permits current to pass from conductor 181 through conductor 200, 177, 164 to the coil of relay HR, thence to conductor 204, 210, 196, 179, 184 and 195 to the switch "out"; where it connects line 156, thus operating the motor 109 to retract the cutter from depth, at the end of which stroke switches B and D are again opened, stopping the operation of the parts until the "start" switch is depressed and the cycle thus started over again.

When it is desired to actuate the apparatus by hand, switch 157 is moved to the contact hand, so that relay CR4 is de-energized and current supplied to conductor 205, thence through conductors 206, 207, and 209 to the contacts of the four manual switches shown at the left end in the drawings.

If, now, the operator depresses the "up" switch, current flows through conductors 187, 185 and 175 to the coil of relay RR1, thence through switch C to line 156, and simultaneously is conducted through conductor 168 to the coil of relay CR1 and back to switch C, through conductor 167. This, of course, actuates motor 65 to move the vertical slide in the direction of its normal return stroke.

If, instead, the operator depresses the "down" push button, current passes through conductor 189 to the coil of relay RR2, thence through conductor 176 to switch D, and from this to line 156, actuating relay RR2 to operate motor 65 in a reverse direction.

When the operator pushes the "in" button, current passes through conductors 193, 191, 177 and 164 to the coil of relay HR, through switch A, conductor 195 to switch "out," where it reaches line 156.

Push "out" button merely reverses the last mentioned circuit, current passing through conductors 194, 191, 177 and 164 to the coil of relay HR.

While the pitch of worms 51 and 63 is low enough to prevent any substantial back drive through the same, and the dwell surfaces of the cam 104 likewise are designed to preclude back drive, we have shown provided magnetic brakes for locking each of the motors against rotation when it is not being operated, these being of a type which will be readily understood by those skilled in the art, and being spring actuated, but held in released position by current passing through a coil when current is being supplied to the motor. The coils of these brakes are illustrated in Figure 11, that of the feed motor 7 being shown at FB, of the horizontal slide moving motor 109 at HB, and that of the return motor 65 at RB.

While we have described the illustrated embodiment of our invention in some particularity, obviously many other embodiments, variations and modifications will readily occur to those skilled in this art, and we do not therefore limit ourselves to the precise details shown and described herein, but claim as our invention all embodiments, variations, and modifications coming within the scope of the appended claims.

We claim:

1. A machine tool comprising a frame, guideways thereon, a carriage slidable on said guideways, a spring between the frame and the carriage capable of moving the carriage on the frame, a spindle carried by the frame, a spindle carried by the carriage, gearing between said spindles, a screw controlling the motion of the carriage on the frame, operative connections between said screw and said gearing, guideways on said carriage, a slide movable on said guideways, a stop limiting the motion of said slide, resilient means urging said slide toward said stop, and means for retracting said slide from said stop.

2. A hobbing machine comprising a frame, a spindle mounted in fixed bearings in said frame, a carriage slidable upon the frame, a slide slidably carried by the carriage, a spindle journalled on said slide, a feed screw between the frame and the carriage, gearing between said spindles including a differential, a motor operatively connected to said gearing, gearing between said first mentioned gearing and said feed screw including a second differential, a motor operatively connected to a part of said second mentioned differential, a spring interposed between the frame and the carriage, a stop carried by the carriage and limiting the motion of the slide in one direction, a plunger for moving the slide toward and from said stop, a spring interposed between said plunger and said slide, a cam associated with said plunger, a motor arranged to rotate said cam, and automatic connections between said motors causing them to operate in sequence.

3. In a machine of the class described, comprising a stationary frame, a work spindle and a tool spindle carried thereby, said spindles being relatively movable in two directions, feed means moving said spindles relatively in one direction, an electrical motor for operating said feed means, quick return means moving said spindles relatively in the opposite direction, a second motor for operating said quick return means, means feeding said spindles into depth relative each other and retracting the same relatively, a third electrical motor for operating said last mentioned means, relays controlling the operation of said motors, switches associated with said feed means, said return means and said depth feeding means and arranged to control said relays automatically moving the tool and work relatively through a closed cycle.

4. In a machine of the class described, comprising a stationary frame, a work spindle and a tool spindle carried thereby, said spindles being relatively movable in two directions, feed means moving said spindles relatively in one direction, an electrical motor for operating said feed means, quick return means moving said spindles relatively in the opposite direction, a second motor for operating said quick return means, means feeding said spindles into depth relative each other and retracting the same relatively, a third electrical motor for operating said last mentioned means, relays controlling the operation of said motors, switches associated with said feed means, said return means and said depth feeding means and arranged to control said relays automatically moving the tool and work relatively through a closed cycle, and manual controlling means associated with and selectively controlling said relays.

5. A machine of the character described comprising two relatively movable spindles, gearing between said spindles, feed means capable of reciprocating said spindles relatively in one direction and controlled by said gearing, feed means capable of reciprocating said spindles relatively in another direction, two motors connected to said first mentioned feed means capable of operating the same at different speeds, a third motor operably connected to said second mentioned feed means, and electrical connections between said motors whereby said last mentioned motor operates intermediate the operation of the two first mentioned motors.

6. A machine of the character described comprising two relatively movable spindles, gearing between said spindles, feed means reciprocating said spindles relatively in one direction, gearing between said feed means and said first mentioned gearing, a motor operatively connected to said first mentioned gearing, a motor operatively connected to said second mentioned gearing, a second feed means for reciprocating the spindles relatively in another direction, a motor operatively connected to said last mentioned feed means, switches controlled by the relative motions of said spindles and automatically causing said motors to operate in sequence, the last mentioned motor being operated between periods of operation of the two first mentioned motors.

7. A machine tool comprising a frame, upwardly extending guides thereon, a carriage slidable upon said guides, a spring interposed between the frame and carriage, and exerting sufficient upward pressure on the carriage at all times to both support the weight of the carriage and cause its upward motion upon said guides, a pair of threaded elements limiting the upward motion of the carriage, one associated with said frame and the other with said carriage, holding means positively locating one of said threaded elements with respect to the frame, and driving means capable of producing relative rotation between said threaded elements.

8. A machine tool comprising a frame, upwardly extending guides thereon, a carriage slidable upon said guides, a spring interposed between the frame and carriage, and exerting sufficient upward pressure on the carriage at all times to both support the weight of the carriage and cause its upward motion upon said guides, a positive stop fixed with relation to the frame, a rigid element interposed between the stop and the carriage and arranged positively to limit the upward motion of the carriage, and driving means actuating said rigid element progressively to vary the position of the carriage on said guides.

9. A machine tool comprising a frame, upwardly extending guides thereon, a carriage slidable upon said guides, a spring interposed between the frame and carriage, and exerting sufficient upward pressure on the carriage at all times to both support the weight of the carriage and cause its upward motion upon said guides, a pair of threaded elements limiting the upward motion of the carriage, one associated with said frame and the other with said carriage, holding means positively locating one of said threaded elements with respect to the frame, driving means capable of producing relative rotation between said threaded elements, a spindle carried by the frame, a second spindle carried by said carriage, positive gearing between said spindles, and positive driving connections between said gearing and said threaded elements.

HOMER C. WARNER.
CHARLES H. SCHURR.